United States Patent [19]
Paredes et al.

[11] 3,866,200
[45] Feb. 11, 1975

[54] LOAD MEASURING AND OVERLOAD WARNING SYSTEM

[75] Inventors: Candelario Paredes, Dallas; Robert Horn, Richardson, both of Tex.

[73] Assignee: Forney Engineering Company, Carrollton, Tex.

[22] Filed: July 25, 1973

[21] Appl. No.: 382,402

[52] U.S. Cl. .................... 340/267 C, 212/2, 214/2, 340/410
[51] Int. Cl. .......................................... G08b 21/00
[58] Field of Search ................ 340/267 C, 272, 410; 212/2; 214/2

[56] References Cited
UNITED STATES PATENTS

| | | | |
|---|---|---|---|
| 3,505,514 | 4/1970 | Fathauer | 340/267 C |
| 3,534,355 | 10/1970 | Fathauer | 340/267 C |
| 3,618,064 | 11/1971 | Hamilton | 340/267 C |
| 3,631,537 | 12/1971 | Zibolski et al. | 340/267 C |
| 3,710,368 | 1/1973 | Hamilton | 340/267 C |
| 3,740,534 | 6/1973 | Kezer et al. | 340/267 C |
| 3,819,922 | 6/1974 | Horn et al. | 340/267 C |

*Primary Examiner*—Glen R. Swann, III
*Attorney, Agent, or Firm*—John P. De Luca; Marvin A. Naigur; John E. Wilson

[57] ABSTRACT

A load which is being hoisted by a crane having at least one line under tension causes a line load responsive transducer to send a signal proportional to the load on such line to an integrated amplifier circuit on a printed circuit card in a power pack. The printed circuit also contains an integrated line multiplier circuit and an actual load signal/load limit signal integrated comparator circuit, as well as a power supply circuit having a regulated constant voltage output for the entire system. Manually adjustable digital line number set switches and load limit set switches are also contained in the power pack for supplying corresponding signals to the multiplier and comparator circuits, whereby visual and audible warning signals are automatically activated on a display module, when the preset load limit is reached. The display module is also provided with an actual load indicating meter, and a push-button test switch for checking a fixed line number simulated signal with the aid of the meter.

4 Claims, 9 Drawing Figures

LOAD MEASURING AND OVERLOAD WARNING SYSTEM

BACKGROUND OF THE INVENTION

In load hoisting rigs including cranes and derricks, there exists a very real need for an accurate, reliable and rugged system for handling signals entirely in the analog mode, for not only continuously indicating the actual weight of a load being handled by the rig, but also for warning the operator when such load reaches a desired preset limit, for his safety as well as that of others during operation of the rig. For example, in the case of boom type cranes, the entire apparatus can turn over should the load limit be exceeded. With heavy loads and long booms, considerable potential danger thus is involved. The present invention makes it possible for the operator to manually preset the system for a desired safe load, and the system automatically sounds a buzzer and flashes a light, warning the operator whenever such load limit is reached, whereby the danger of an excess load can be avoided.

There is also a need for an analog warning system that is simple in construction, and easy to read, as well as one that can be quickly and inexpensively repaired in case of failure. The system of the present invention solves such need by providing a system which uses only a single printed circuit card for an entire analog circuit including a power supply sub-circuit having a regulated constant voltage output for the other transistorized components of the system. Such sub-circuit can be connected to the battery of the vehicle carrying the rig, or to any external source of direct current that is available.

In case several lines are involved in the load carrying rig, some means for multiplying the load tension on one line by the number of lines being used, is necessary. Also, means are required for automatically comparing the actual load with a desired load limit, so that a warning indicator is activated as soon as the actual load reaches the desired load limit. In the present case, these functions are performed by suitable integrated circuits that are also integrated with the printed circuit in conjunction with external manually adjustable digital switches for manually setting both the line number, and the desired load limit in pounds.

Further requirement is the need for a simplified method of quickly checking the accuracy of the load indicating meter itself, while the rig is not in load lifting mode. This is accomplished in the present invention by a push-button operated relay test circuit, that is manually operated to internally switch the printed circuit so that the actual load signal is removed, and a simulated line number and load signal only is used to operate the meter full scale.

It is also desirable to provide a system in which the digital switches are in the power pack that is separate from the display module so that each can be conveniently located for the operator. Thus, in accordance with the present system, the display module may be located in front of the operator in the cab, with the power pack within easy reach.

A load indicating system of universal application is also desirable. For example, one that can be used with one line as well as multiple line rigs of boom type cranes, derricks, or any other type of load hoisting machine in which a load is suspended by a line. The present invention is suitable for any type of machine of such nature, requiring installation of only three units, including a line load cell, display module and power pack module.

SUMMARY OF THE INVENTION

In accordance with an illustrative embodiment demonstrating features and advantages of the present invention, there is provided a load indicating system including a power pack containing a card with a printed circuit having an integrated DC current power supply sub-circuit with a regulated constant voltage output for the entire system.

A first integrated amplifier circuit is adapted to be connected to the signal output of a line load transducer cell circuit that is provided with an excitation voltage by the DC power supply sub-circuit, which output is proportional to the load suspended by one line.

A second integrated amplifier circuit is connected to the first amplifier circuit for automatically multiplying the signal output of the first amplifier circuit by a signal corresponding to the total number of lines used in suspending the load, and a load limit/actual load integrated comparator circuit is provided for automatically comparing signals corresponding thereto.

A combined parts-of-line set switch and a load limit set switch are associated with the power pack including manually operated digitally numbered switch means for presetting the number of lines used in suspending the load, and the desired load limit, respectively.

The switch means is connected to the printed circuit by conductors connected to the appropriate sub-circuits thereof for producing an output signal corresponding to the actual load suspended by the line, and a warning output signal by the comparator circuit when the load limit is reached.

A display module is provided including a load indicating meter connected to the actual load output signal, and a red light and buzzer responsive to such warning signal for indicating the existence of such preset load limit on the line.

BRIEF DESCRIPTION OF THE DRAWINGS

The above brief description as well as further objects, features, and advantages of the present invention will be more fully appreciated by reference to the following detailed description of a presently preferred but nonetheless illustrative embodiment in accordance with the present invention when taken in connection with the accompanying drawings wherein.

DESCRIPTION OF THE PREFERRED EMBODIMENT LINE LOAD TRANSDUCER

Figure 1:
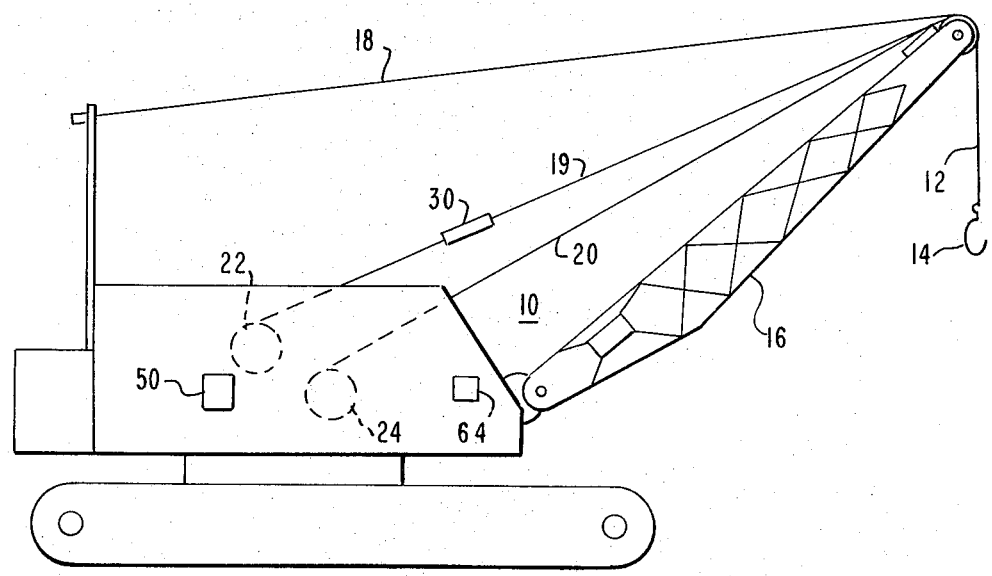
FIG. 1 is an elevational view of a boom type crane in which the load indicating system of the present invention is employed.

As shown in FIG. 1, a boom type crane 10, is provided with a line 12 having a hook 14 for hoisting a load (not shown) when the boom 16 is raised or lowered, as well as when the lines 18, 19 and 20 are reeled in or out by drums 22 and 24. Associated with at least one of such lines is a tensiometer, or a dead end of line load (compression) sensor, comprising in either case a load cell 30, FIG. 2. While the load cell 30 can be used with other equipment than the tensiometer, or a dead end of line (compression) sensor, for measuring the line load, the latter are optional with the present system, and each preferably comprises the basic load cell 30.

The tensiometer is used for measuring line tension regardless of the parts-of-line in use. The line tension is measured directly as the force acting on the load cell 30. For example, cell 30 acts as a tensiometer when line 19 is under load bearing tension.

Figure 7:
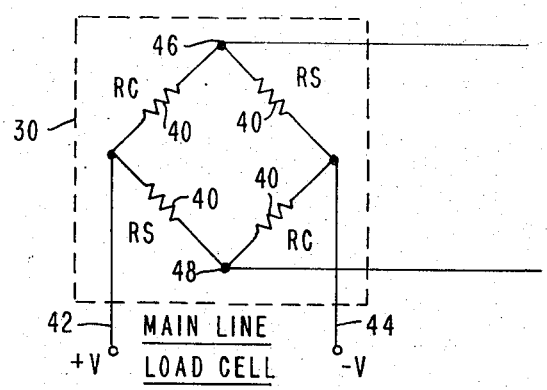
FIG. 7 is a circuit diagram of the load cell of FIG. 4.

In addition, virtually any other type of line load transducer may be used with the present system, provided the output signal thereof is porportional to the line load, and is a DC voltage. As shown in FIG. 7, the basic cell 30 for the preferred load transducer or tensiometer of the invention, comprises four strain gage resistors 40 of equal value, arranged in a Wheatstone Bridge circuit having constant voltage input terminals 42 and 44, and signal voltage output terminals 46 and 48. The device functions so that a compressive or tension load on the cell generates a signal voltage output across terminals 46, 48 the value of which is proportional to such load.

POWER PACK

Figure 3:
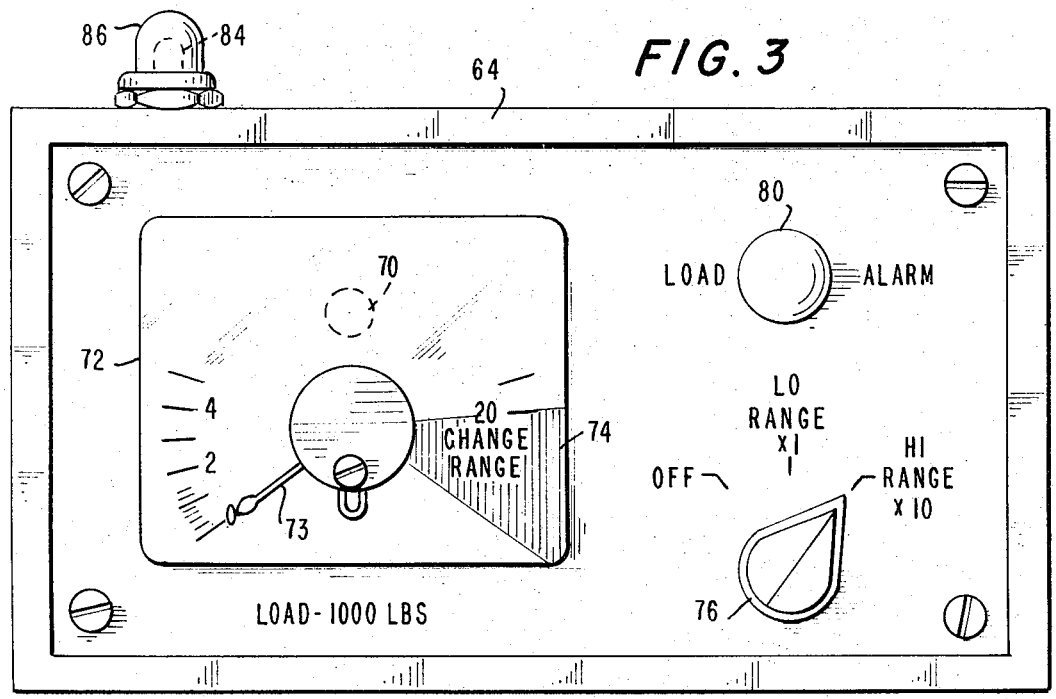
FIG. 3 is a perspective view of a load display module.
Figure 4:
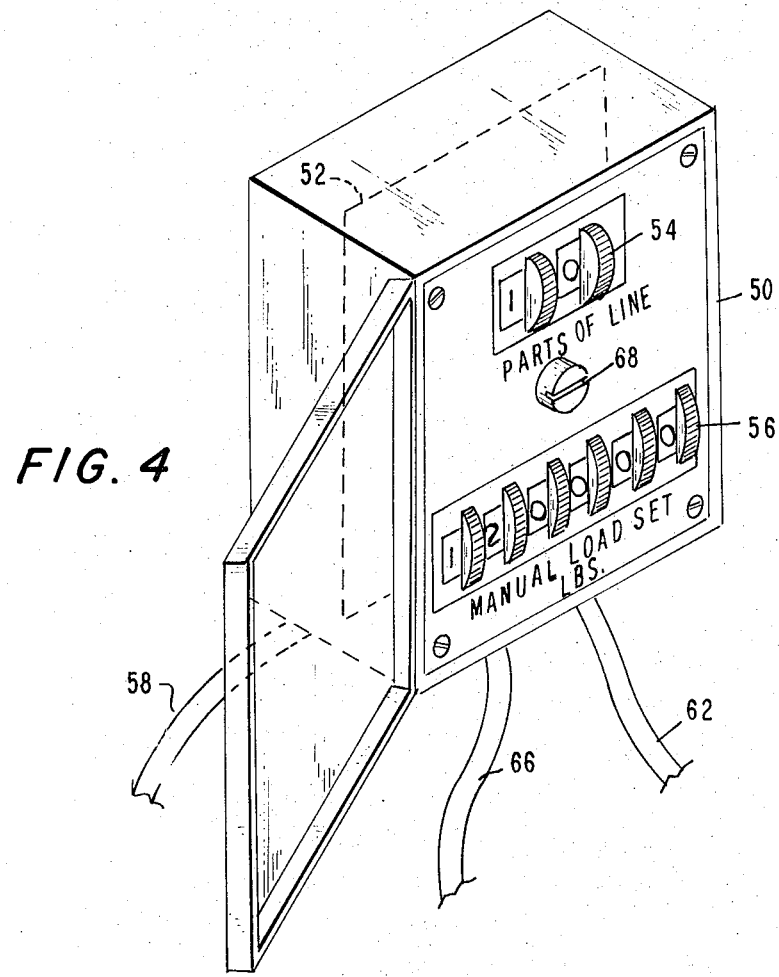
FIG. 4 is a perspective view of a power pack.
Figure 5:
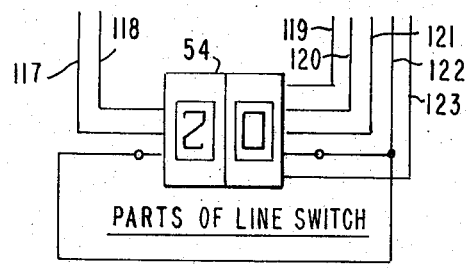
FIG. 5 is a circuit diagram of the parts-of-line set switch and load limit set switch section of the power pack.
Figure 5:
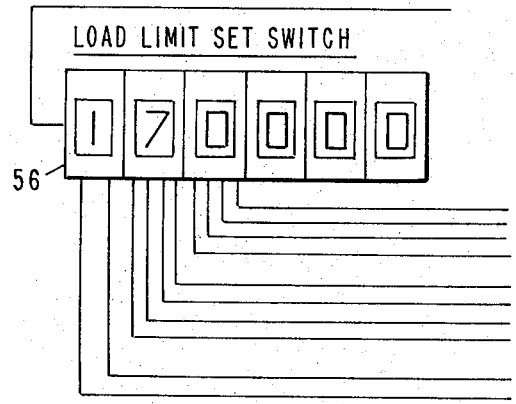
Figure 8:
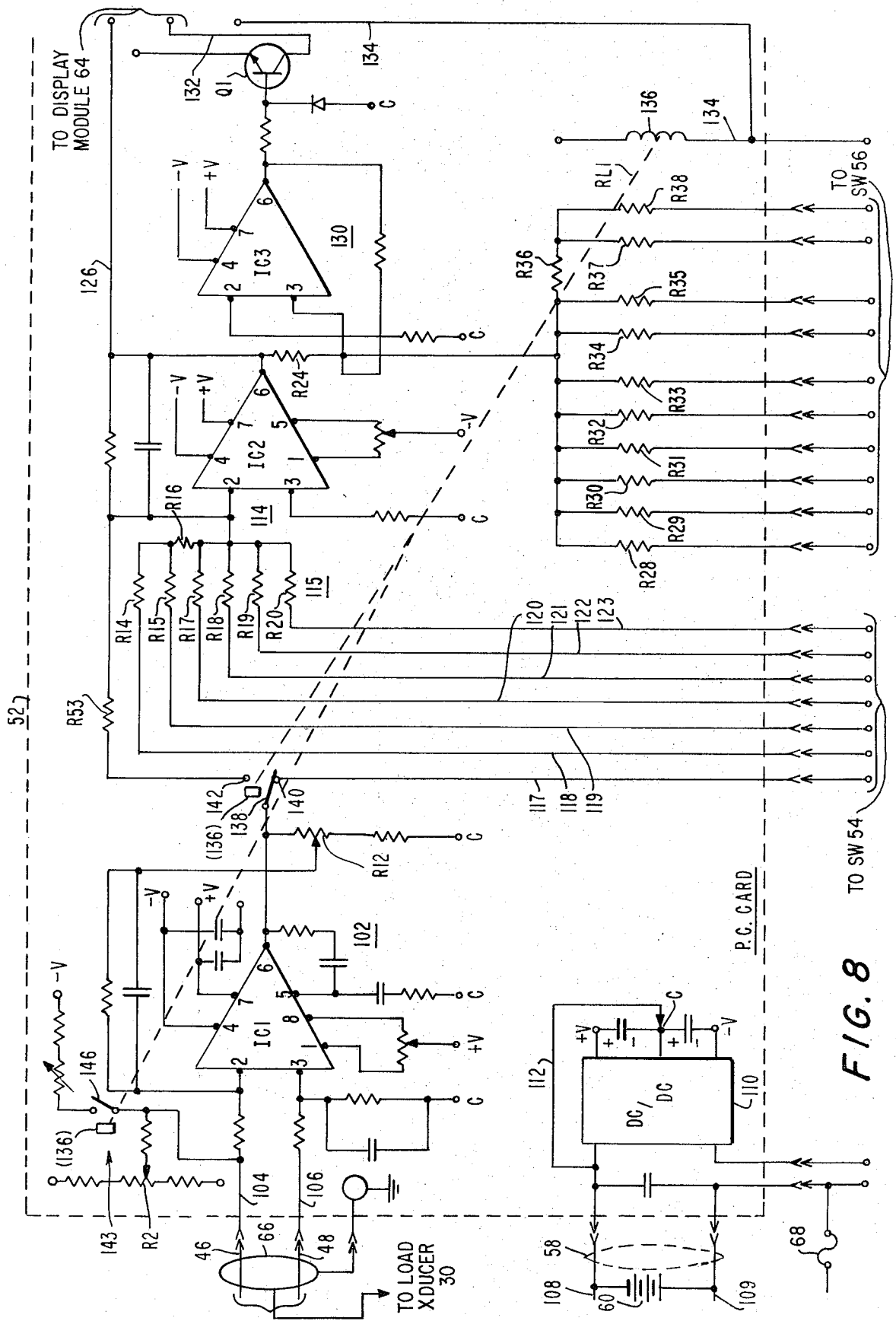
FIG. 8 is a circuit diagram of the entire system.

As shown in FIG. 4, power pack 50 comprises a single printed circuit card 52, FIG. 8, which contains the main transistorized electronic circuit for the system; the two digit thumbwheel switch register 54, FIG. 5, for manually selecting the number of the parts-of-line in use in the load line rigging; and a six digit thumbwheel switch register 56 for manually presetting the desired maximum load limit in pound units. An insulated cable 58 connects the power pack 50 to the vehicle power supply, such as a 12 or 24 VDC battery 60, FIG. 8; and a shielded cable 62 connects the power pack 50 to the display module 64, FIG. 3. The power pack 50 is connected to the load transducer 30, FIG. 7, by a shielded cable 66 containing insulated conductors 42, 44, 46 and 48. The display module 64 and line load transducer 30 are electrically connected to the power pack 50 and internally connected to the printed circuit board card 52, as shown in FIG. 8. A panel mounted fuse 68 is also provided in the power pack 50 for protection of the main circuitry.

DISPLAY MODULE

The display module 64, FIG. 3, is equipped with a lamp 70 for back-lighting a load indicating (analog) meter 72 for displaying the load in pounds. The meter scale 74 is divided into major divisions corresponding to 0-200, so that when operating on low "Lo" range, the meter scale corresponds to 0-20,000 lbs. (20K) and when operating on high "Hi" range, the meter corresponds to 0-200,000 lbs.(20K × 10). Such ranges are selected by a manually adjusted switch handle or knob 76 on the panel 78 of the module 64.

Figure 6:
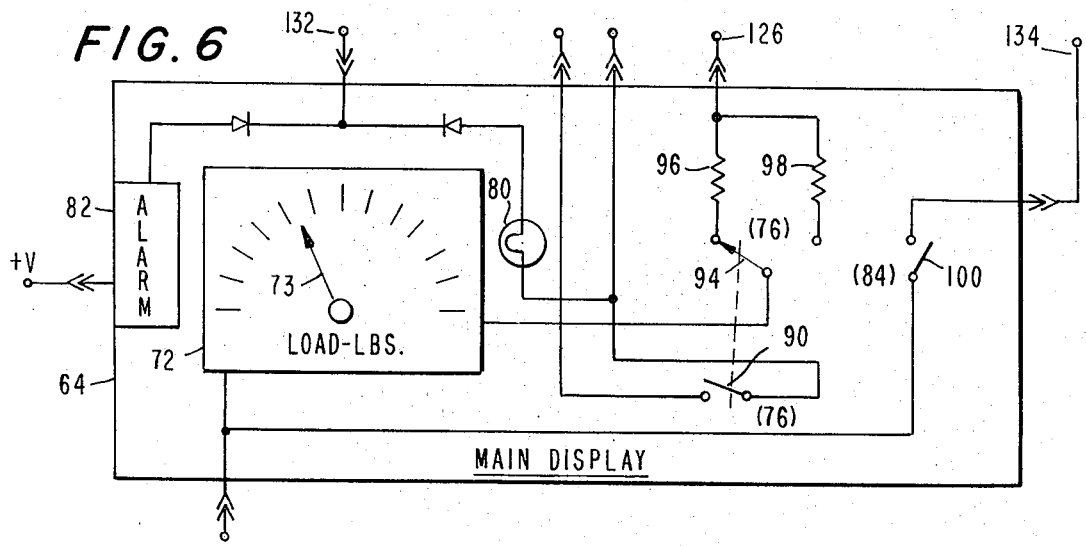
FIG. 6 is a circuit diagram of the display module of FIG. 3.

The unit 64 is also equipped with a red warning lamp 80, and an alarm buzzer 82, as well as with a test switch push button 84 covered by a protective nipple 86. As shown in FIG. 6, switch lever 76 controls a main circuit ON/OFF switch 90, and a range selector switch 94. The latter is adapted to be switched either to a high resistor 96, or to a low resistor 98 (representing the 200,000 lb. and 20,000 lb. range of the meter scale 74). The function of test switch 100, when operated by the push button 84, is set forth below. However, briefly, when the test switch push button 84 is depressed and held, closing switch 100, the internal circuitry can be checked by observing the meter 72 under a fixed simulated load, such that full scale deflection of the pointer hand 73 of meter 72 is achieved when the knob 76 is on Hi range.

OPERATION OF THE SYSTEM

As shown in FIG. 8, the printed circuit card 52 comprises a load cell signal amplifier circuit 102 provided with an integrated circuit IC1 and associated circuitry. The conductors 46, 48 in shielded cable 66 from the load transducer cell 30, FIG. 7, are connected to the input leads 104, 106, respectively, of the amplifier IC1, supplying a differential millivolt signal thereto. Such signal is, in turn, amplified by said amplifier IC1. A potentiometer R2 is adjusted to the "zero" load cell output signal at no load, and a potentiometer R12 comprises the gain adjustment of the amplifier IC1. The output of the load cell signal amplifier IC1 is a signal proportional to the line tension due to the load carried by the rig.

A DC/DC integrated sub-circuit 110 is incorporated in the printed circuitry on card 52, and is connected to the vehicle battery 60 by insulated conductors 108, 109 in the cable 58. The output terminals c, +V and −V provide equal regulated constant positive and negative voltage supply sources for the system, the terminal C being neutral and grounded by lead 112 to the negative side 108 of battery 60. The voltage supply circuit 110 provides an excitation voltage for the load cell transducer 30, and also powers the amplifier IC1.

The printed circuit also contains a parts-of-line signal amplifier circuit 114 comprising an integrated circuit IC2 and its associated circuitry. This circuit takes the desired line load signal and amplifies it by the selected number of parts-of-line from drum switch 54, FIG. 5, and resistor bank 115, so that its output is proportional to the total load. Conductors 117, 118, 119, 120, 121, 122 and 123 from switch 54, FIG. 5, are connected to corresponding circuits on the card 52, FIG. 8. The output signal of the parts-of-line amplifier 114 is transmitted via lead 126 to range resistors 96 and 98, FIG. 6, of the load indicating meter 72, which shows the weight of the load being hoisted by the rig. The meter 72 is a voltmeter calibrated to indicate the load in pounds in conjunction with the series resistor setting of switch 94 by knob 76, FIG. 3. The gain of the parts-of-line amplifier 114 is changed by paralleling one or more of its input resistors R14–R20 in bank 115 by means of the parts-of-line switch 54, FIG. 4.

The printed circuit also contains a load limit comparator circuit 130 comprising an integrated circuit IC3 and its associated circuitry. The total load signal is applied to a resistor R24, causing a current to flow into the input terminal 3 of the amplifier IC3. A current proportional to the desired load limit set switch 56, FIG. 4, flows out of input terminal 3 of IC3, FIG. 8, through one or more of the resistors R28 through R38 in bank 116 which can be switched in and out of the common circuit 133 by the load limit set switch 56, as desired. If the load limit set current is greater than the total load current, then current tends to flow out of the input 3 of amplifier IC3. This causes the output of circuit 130 to become negative, turning off transistor Q1. When the reverse is true, such that the total load current is greater, then the current tends to flow into input 3 of IC3. This causes the output of circuit 130 to become positive, thereby turning on transistor Q1, and activating both the red alarm lamp 80 and audible alarm 82, FIGS. 3 and 6, via trigger lead 132, FIG. 8.

The test feature of the present system simulates a known load signal across the load cell which results in a known reading on the meter 72. Thus, pressing push button 84, FIG. 3, closes switch 100, FIG. 6, in circuit 134, FIG. 8, containing a relay coil 136 of relay RL1, energizing such coil 136 which thereupon changes switch 138 from contact 140 to contact 142. The normal position of the switch 138 is with contact 140 of lead 117 to the parts-of-line set switch 54, FIG. 4. However, with energization of system test relay RL1, such contact 140 is disconnected, and at the same time, switch 138 closes contact 142 with a simulated parts-of-line circuit containing a resistor R53, the value of which simulates a fixed number of parts-of-line. For example, when a 10,000 lb. load and 20 parts-of-line is simulated, this results in a full scale reading of 200,000 lbs. on the Hi range of the meter 72.

Figure 9:
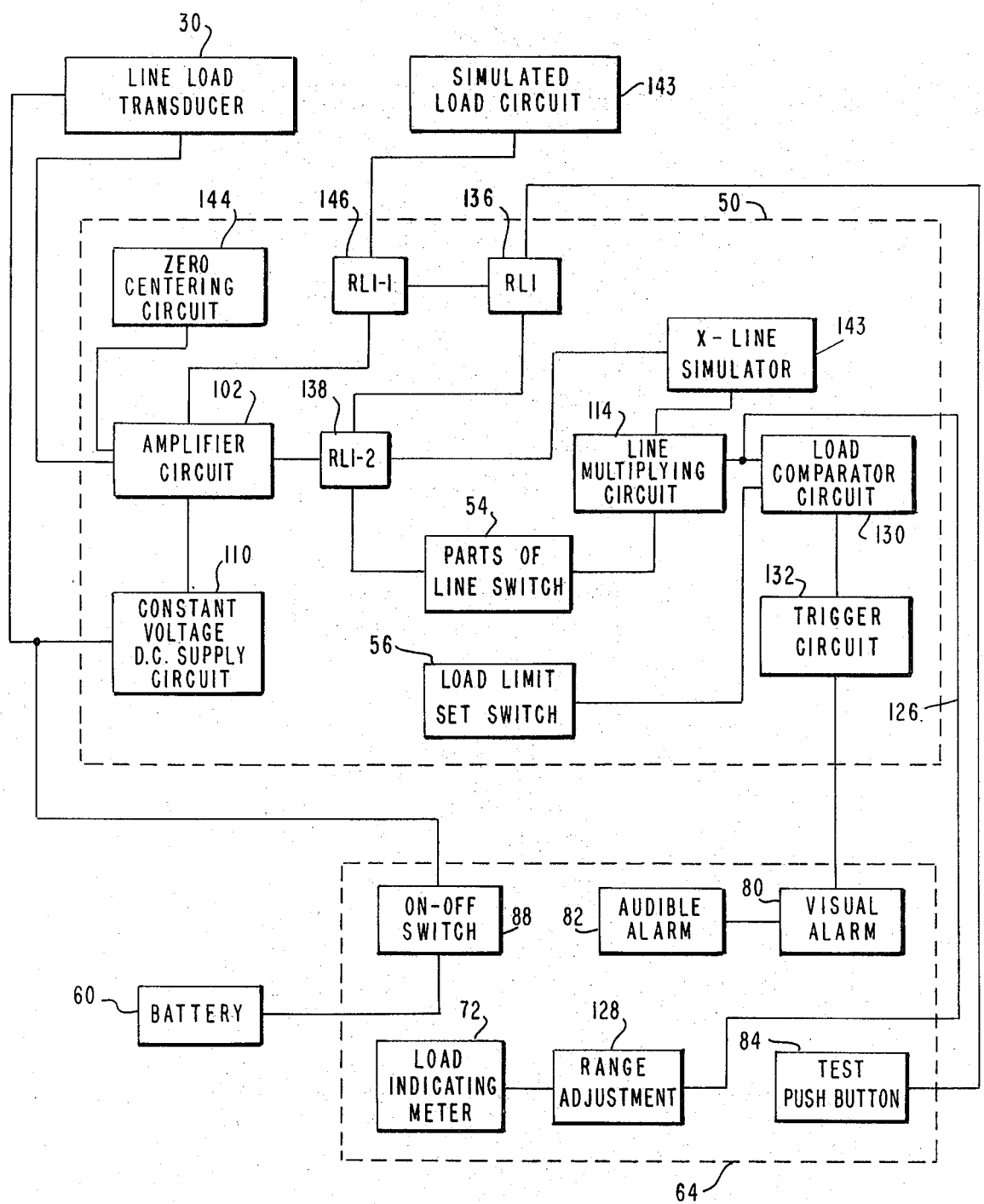
FIG. 9 is a block diagram of the system.

As shown by the block diagram of the present system, FIG. 9, load transducer circuit 30 is driven by an excitation voltage of constant value from the regulated constant voltage power supply circuit 110 on the printed circuit card 52, and sends a voltage signal proportional to the load on such line, to the amplifier circuit 102 which is also powered by the CV supply circuit 110. The latter, in turn, is powered by the battery 60 through the ON/OFF switch 88. The amplified single line load signal normally goes through a relay RL1-2 test switch 138 by way of parts-of-line switch 54 to the parts-of-line set amplifier circuit 114 which, in effect, multiplies (x) the single line load signal by the number of lines in use, as set on the parts-of-line switch 54, producing the total actual load signal. The latter is applied to the comparator circuit 130 along with a desired load limit signal as set on the load limit set switch 56. The actual load signal goes to the load indicating meter 72 through the range adjustment lead circuit 128, so that the meter 72 indicates the actual weight in pounds of such load.

When it is desired to check the system, the P.B. 84 test switch 100 is closed, energizing test RL1 relay coil 136. This causes RL1-1 switch 146 to connect the simulated load circuit 143 to the input of amplifier circuit 102. Simultaneously, RL1-2 switch 138 connects the fixed x-line simulating circuit 143 (containing resistor R53, FIG. 8) to the parts-of-line amplifier circuit 114 which thereupon transmits the resultant fixed simulated signal directly to the load indicating meter 72 via the range adjustment circuit 128. This indicates whether or not the system is functioning as calibrated.

The load measuring system of the invention continuously indicates the actual load and is suitable for use with all types of cranes, derricks, hoists, and the like. The load transducer can be of any suitable type provided its output signal is a DC voltage that is proportional to the tension in one line supporting the load.

The power pack comprises: 1. The single printed circuit card comprising the electronic circuit for the system. 2. The two digit thumbwheel switch for manual selection of the parts-of-line in use. 3. The six digit thumbwheel switch for manual selection of the allowable load limit.

The display module is equipped with: 1. The analog (volt) meter calibrated for indicating the load in pounds (in conjunction with the range adjustment). 2. The red warning light that is energized automatically whenever the measured load exceeds the manually set load limit. 3. The system ON/OFF switch. 4. The meter load-range selector switch. 5. The audible alarm that goes ON when the red warning light is energized. 6. The test push-button switch located on top of the module, which when depressed, results in a simulate load signal such that full scale deflection of the meter occurs in the Hi range.

The cables from the vehicle power supply (usually a 12 or 24 VDC battery) display module, and load transducer are connected to the power pack and internally therein to the printed circuit board (card).

Referring again to FIG. 8, the load cell amplifier consists of the IC1 and its associated circuitry. Its function is to amplify a differential millivolt signal from the load cell. Potentiometer R2 is used to zero the load cell output signal at no load, and potentiometer R12 is the gain adjustment for the amplifier. The output of the load cell amplifier is a signal proportional to line tension.

The parts-of-line amplifier consists of the IC2 and its associated circuitry. This circuit takes the line load signal and amplifies it by the parts-of-line set so that its output is proportional to total load. This signal is then used to drive the load indicating meter. This meter can display either one of two ranges by selecting a desired one of the two series resistors by means of the front panel switch. The gain of the parts-of-line amplifier is changed by paralleling one or more of its input resistors R14–R20 through the parts-of-line switch.

The load limit comparator circuit consists of the IC3 and its associated circuitry. The total load signal is applied to resistor R24 and causes a current to flow into input 3 of IC3. A current proportional to load limit set flows out of input 3 through one or more of resistors R28–R38 which are switched in and out by the load limit set switch. If the load limit set current is greater than the total load current, then a current would tend to flow out of input 3 of IC3. This causes the output of IC3 to go negative turning transistor Q1 off. If the reverse is true, such that the total load current is greater, then a current would tend to flow into input 3. This would cause the output of IC3 to go positive, thereby turning transistor Q1 on which in turn would turn on the alarm and energize the red alarm light.

The test circuit simulates a known load signal across the load cell inputs which would result in a known reading on the load meter if everything is properly working. Actuating the test push button energizes relay RL1 146. Contact RL1-1 applies the load signal when the relay is energized. At the same time contact RL1-2 138 disconnects the parts-of-line switch and connects R53 which simulates a fixed number for parts-of-line. For example, a 10,000 lb. load and 20 parts-of-line could be simulated which should give a full scale reading of 200,000 lbs. on Hi range.

Figure 2:
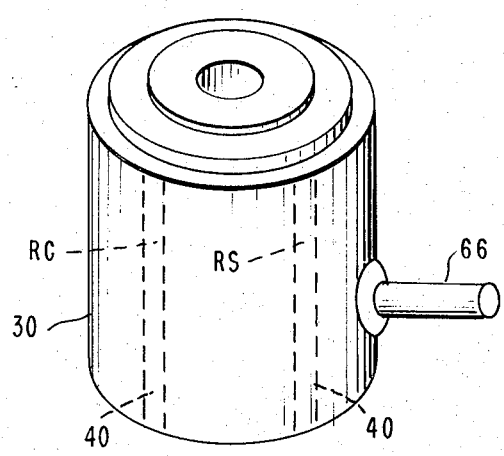
FIG. 2 is a perspective view of a line load (transducer) cell.

The load cell, FIGS. 2 and 7, is preferably constructed of a thick cylinder having two of the resistors 40 in the form of metal alloy strips taped to the cylinder lengthwise thereof, and the opposite pair provide temperature compensating means. For example, resistors RC, constitute the temperature compensators, while resistors RS constitute strain gauges which act in tension on the cell cylinder.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An improved load measuring and indication system for a multi-line hoisting rig, comprising means responsive to the tension of at least one load supporting line of such rig including, a transducer load cell associated with such line, a power pack for supplying a regulated constant voltage power to the system, a first amplifier circuit connected to said load cell for producing a signal that is proportional to the tension on such line by virtue of the load, a second amplifier for multiplying the signal by a signal corresponding to the number of lines of such rigging used in lifting the load, a selectable parts of line switch for setting such signal corresponding to the number of lines to be multiplied by such second amplifier, a third amplifier for comparing the total signal output of such second amplifier with a signal corresponding to desired load limit signal, selectable load limit switch means for establishing the signal corresponding to the desired load limit, trigger means responsive to the third amplifier operable for producing an output when the actual load signal to said third amplifier circuit reaches the desired load limit signal, display module having a meter connected to said second amplifier for indicating the actual load signal output of the second amplifier circuit and a warning light and audible indicator energized by the trigger whenever the actual load reaches the desired load limit wherein the improvement comprises: relay means normally coupling the first amplifier with the load cell output and the parts of line switch, and operative, when energized, for breaking said connections and coupling a test input to the first amplifier, and its output to an input for the meter, test circuit means for energizing the relay and coupling the test signal corresponding to a known load simulating signal to the first amplifier.

2. The system as described in claim 1 wherein the parts of line switch and the load limit switch include manually operated digitally numbered switch means for presetting the number of lines used in suspending the load, and the desired load limit respectively for producing an associated output signal corresponding to the number of lines and load limit to be suspended by the line.

3. The system as described in claim 1 whereinwhich said display module includes; a range switch circuit for said meter comprising: a manually operable switch having different stations and preselected resisters in circuit with said switch selectively coupled with the meter circuit whereby the meter indicates the load in a desired range.

4. The system as described in claim 1 wherein the means provided for testing the system includes; a first switch contactor for applying the simulated known test load signal to the input of the first amplifier when closed, a second switch contactor for decoupling the manually set number of lines signal from the second amplifier and at the same time coupling a fixed parts of line simulating test signal based upon such simulated known load signal for energizing the meter.

* * * * *